United States Patent
Firanski et al.

(10) Patent No.: US 9,586,673 B2
(45) Date of Patent: Mar. 7, 2017

(54) SYSTEM FOR ALIGNING A PROPELLER

(71) Applicant: AeroVironment, Inc., Monrovia, CA (US)

(72) Inventors: Jason Allen Firanski, Simi Valley, CA (US); Justin Bates McAllister, Simi Valley, CA (US); Ronald Howard Olch, Van Nuys, CA (US); Lane Dennis Dalan, Simi Valley, CA (US); Emil Ghapgharan, Burbank, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 187 days.

(21) Appl. No.: 14/184,560

(22) Filed: Feb. 19, 2014

(65) Prior Publication Data
US 2015/0008857 A1    Jan. 8, 2015

Related U.S. Application Data

(63) Continuation of application No. PCT/US2012/051213, filed on Aug. 16, 2012.
(Continued)

(51) Int. Cl.
*H02K 29/08* (2006.01)
*B64C 11/00* (2006.01)
(Continued)

(52) U.S. Cl.
CPC .............. *B64C 11/002* (2013.01); *B64C 1/00* (2013.01); *B64C 3/00* (2013.01); *B64C 11/02* (2013.01); *B64C 39/024* (2013.01); *B64D 27/24* (2013.01); *B64D 31/06* (2013.01); *H02P 6/16* (2013.01); *B64C 2201/042* (2013.01); *B64C 2201/165* (2013.01); *H02K 29/08* (2013.01); *H02K 29/12* (2013.01); *H02P 6/14* (2013.01); *Y02T 50/44* (2013.01); *Y02T 50/62* (2013.01)

(58) Field of Classification Search
CPC .......... H02K 29/08; H02K 29/12; H02P 6/16; H02P 6/14; H02P 6/06
USPC ..................................................... 318/400.38
See application file for complete search history.

(56) References Cited

U.S. PATENT DOCUMENTS 2,770,798 A    11/1956  Roth
4,073,309 A    2/1978   Fraser et al.
(Continued)

OTHER PUBLICATIONS

International Search Report for PCT Serial No. PCT/US12/51213 mailed Apr. 26, 2013.

*Primary Examiner* — Kawing Chan
*Assistant Examiner* — Bradley Brown
(74) *Attorney, Agent, or Firm* — Brooks Acordia IP Law, P.C.; Eric Aagaard

(57) ABSTRACT

A motor assembly that includes a motor (102) having a rotatable shaft, a hub coupled to the rotatable shaft, the hub having a propeller indexer to receive a propeller (104), when the propeller is present, a sensor trigger rotatable with the shaft (100) and positioned at a propeller offset angle $\theta_{PROP}$ from the propeller indexer, and a sensor coupled to the motor and positioned to detect the sensor trigger so that the propeller indexer may be positioned at the propeller offset angle $\theta_{PROP}$ from the sensor through rotation of the shaft so that said sensor is proximate to the sensor trigger.

24 Claims, 8 Drawing Sheets

Related U.S. Application Data

(60) Provisional application No. 61/525,593, filed on Aug. 19, 2011.

(51) Int. Cl.
*B64C 11/02* (2006.01)
*B64C 39/02* (2006.01)
*B64D 27/24* (2006.01)
*B64D 31/06* (2006.01)
*B64C 1/00* (2006.01)
*B64C 3/00* (2006.01)
*H02P 6/16* (2016.01)
*H02K 29/12* (2006.01)
*H02P 6/14* (2016.01)

(56) References Cited

U.S. PATENT DOCUMENTS

| | | | |
|---|---|---|---|
| 4,345,192 A | 8/1982 | Kohzai et al. | |
| D317,003 S | 5/1991 | Tribe et al. | |
| 5,259,729 A * | 11/1993 | Fujihira et al. | 416/25 |
| 5,322,243 A | 6/1994 | Stoy | |
| 5,645,250 A * | 7/1997 | Gevers | B64C 1/00 244/101 |
| D417,639 S | 12/1999 | Carichner et al. | |
| D461,159 S | 8/2002 | Miralles | |
| 6,601,795 B1 | 8/2003 | Chen | |
| 7,026,773 B2 * | 4/2006 | Petersen | H02K 21/12 318/400.01 |
| 7,145,308 B1 * | 12/2006 | Chase | H02K 7/088 310/268 |
| 7,584,925 B2 | 9/2009 | Miller et al. | |
| 7,793,606 B2 | 9/2010 | Olivier et al. | |
| 7,816,635 B2 | 10/2010 | Fink | |
| 8,089,034 B2 | 1/2012 | Hammerquist | |
| 2007/0152098 A1 | 7/2007 | Sheahan, Jr. et al. | |
| 2010/0026994 A1 * | 2/2010 | Bove | G01D 5/28 356/138 |
| 2011/0115419 A1 * | 5/2011 | Kern | 318/400.09 |
| 2011/0197703 A1 * | 8/2011 | Badre-Alam | B64C 11/008 74/574.1 |
| 2012/0224951 A1 * | 9/2012 | Degner | F04D 25/062 415/174.1 |

* cited by examiner

SYSTEM FOR ALIGNING A PROPELLER

This application is a continuation of International Patent Application No. PCT/US12/51213, filed Aug. 16, 2012, which claims priority to and the benefit of U.S. Provisional Patent Application Ser. No. 61/525,593 filed Aug. 19, 2011, both of which are hereby incorporated herein by reference in their entirety for all purposes.

TECHNICAL FIELD

The technical field relates to motors, and more particularly to motors that have a propeller to propel an aircraft.

BACKGROUND

Unmanned aerial vehicles (UAVs) may be launched to provide remote observation of a location of interest and to then return to ground for landing and recovery. Some UAVs do not have landing gear, or have landing gear that is not sufficient to clear the propeller during landing. Damage to the aircraft may result, including damage to the propeller and engine compartment should the propeller strike the ground during landing. A need continues to exist to reduce the possibility of damage to the propeller and engine compartment during landing.

SUMMARY

A motor assembly is disclosed that includes a motor having a rotatable shaft, a hub coupled to the rotatable shaft, the hub having a propeller indexer to receive a propeller, when a propeller is present, and a sensor trigger rotatable with the shaft and that may be positioned at a propeller offset angle $\theta_{PROP}$ from the propeller indexer. A sensor is coupled to the motor and positioned to detect the sensor trigger so that the propeller indexer may be positioned at the propeller offset angle $\theta_{PROP}$ from the sensor through rotation of the shaft and alignment of the sensor with the sensor trigger. If the sensor trigger is a magnet, then the sensor may be a Hall Effect sensor. If the sensor trigger is a mirror, the sensor may be an infrared detector or a light detector. Other embodiments may use other sensors such as an inductive proximity sensor or light detector to detect a light beam break. The sensor trigger may be coupled to the hub or propeller. If coupled to the hub, a second sensor trigger may be coupled to the hub on a side of the hub opposite from the sensor trigger to weightably balance the hub. In one embodiment, the propeller indexer may be a channel to receive the propeller. In other embodiments, the propeller indexer may be a tab to seat the propeller.

A method of securing a propeller includes commutating a sensor trigger by commutating a shaft of a motor, the motor having stators and rotors, commutating a propeller indexer by commutating said shaft, said propeller indexer configured to align a propeller, when a propeller is present, at an angular position that is a propeller offset angle $\theta_{PROP}$ from said sensor trigger as referenced by a center of rotation of said shaft. The method also includes sensing the sensor trigger as the sensor trigger rotates to a point adjacent a sensor fixedly coupled to the motor, and switching a control signal to rotatably hold the rotors driving the rotatable shaft in response to the sensor sensing the sensor trigger so that the propeller indexer may be held in position at the propeller offset angle $\theta_{PROP}$ from the sensor by commutating the shaft and holding the rotors to align the sensor with the sensor trigger. The step of sensing the sensor trigger may include sensing a magnet using a Hall Effect sensor. The sensor trigger may be a mirror and so sensing the sensor trigger may include sensing electromagnetic radiation reflected off of the mirror. Switching a control signal may include turning off two of three phase circuits driving the rotors so that a third phase current remains to provide a holding force to the rotors to align the sensor trigger and the sensor. If two of the three phase circuits are turned off so that a third phase current remains to provide a holding force for the rotors, the method may also include increasing current to the third phase circuit in response to the sensor sensing the sensor trigger is drifting away from the sensor. In such a case, the shaft may be commutated in response to the sensor trigger drifting away from the sensor. Additionally, the third phase circuit may be held at a maximum holding current to recapture the sensor trigger and then reduced from the maximum holding current to a nominal holding current in response to the sensor sensing the sensor trigger. In one embodiment, the switching of a control signal to rotatably hold the rotors may include switching the motor to electrically couple phase circuits to magnetically hold the rotors. In such a case, the method may also include calculating sensor trigger angular location verses time, determining the sensor trigger will not pass the sensor in a next rotation of the sensor trigger and initiating the switching of the motor to electrically couple phase circuits in response to the determining the sensor will not pass the sensor in a next rotation of the sensor trigger step. The phase circuits are electrically coupled, the method may also include calculating a nearest position of the sensor trigger to the sensor for a next rotation of the sensor trigger, and initiating the switching motor to electrically couple the phase circuits at the nearest position.

An exemplary motor assembly includes an aircraft having a wing, a motor coupled to the aircraft to provide propulsion, the motor having a rotatable shaft, a hub coupled to the rotatable shaft, the hub having a propeller indexer to receive a propeller, when a propeller is present, a magnet coupled to the hub and a Hall Effect sensor coupled to an interior casing for the motor so that the Hall Effect sensor is proximate to the magnet when the propeller is aligned with the wing. The method may include a motor controller electrically coupled to the motor, the motor controller configured to commutate the propeller to a horizontal position indicated by the Hall Effect sensor positioned proximate to the magnet. The method may also include a second magnet coupled to the hub on a side of the hub opposite from the magnet to weightably balance the hub.

Another exemplary embodiment of a motor assembly includes an aircraft having a wing, a motor mounted in the aircraft, the motor having a rotatable shaft, a propeller coupled to the rotatable shaft, the propeller having a magnet, and a Hall Effect sensor coupled to an interior casing for the motor to detect the magnet so that the Hall Effect sensor is proximate to the magnet when the propeller is aligned with the wing. The method may also include a motor controller electrically coupled to the motor, the motor controller configured to commutate the propeller to a horizontal position indicated by the Hall Effect sensor being proximate to the magnet. If the method includes the magnet, the method may also include a second magnet coupled to the propeller on a side of the propeller opposite from the magnet to weightably balance the propeller.

An exemplary embodiment of a motor assembly also includes an aircraft having a wing, a motor mounted in the aircraft, the motor having a rotatable shaft, a propeller coupled to the rotatable shaft, the propeller having a magnet and a Hall Effect sensor coupled to an interior casing for the motor to detect the magnet so that the Hall Effect sensor is proximate to the magnet when the propeller is aligned with the wing. The method may also include a motor controller electrically coupled to the motor, the motor controller configured to commutate the propeller to a horizontal position indicated by alignment of the Hall Effect sensor and the magnet.

Another embodiment of a motor assembly includes a motor having a rotatable shaft, a hub coupled to the rotatable shaft, the hub having a propeller indexer to receive a propeller, when a propeller is present and sensor trigger means rotatable with the shaft. Sensor means may be coupled to the motor and positioned to detect the sensor trigger means so that the sensor means is proximate to the sensor trigger means when the propeller is in a horizontal position. In such embodiments, the sensor means may be a magnet or a Hall Effect sensor. The sensor trigger means may be coupled to the propeller.

BRIEF DESCRIPTION OF THE DRAWINGS

Embodiments of the invention are illustrated by way of example and not limitation in the figures of the accompanying drawings, and in which.

DETAILED DESCRIPTION

Figure 12:
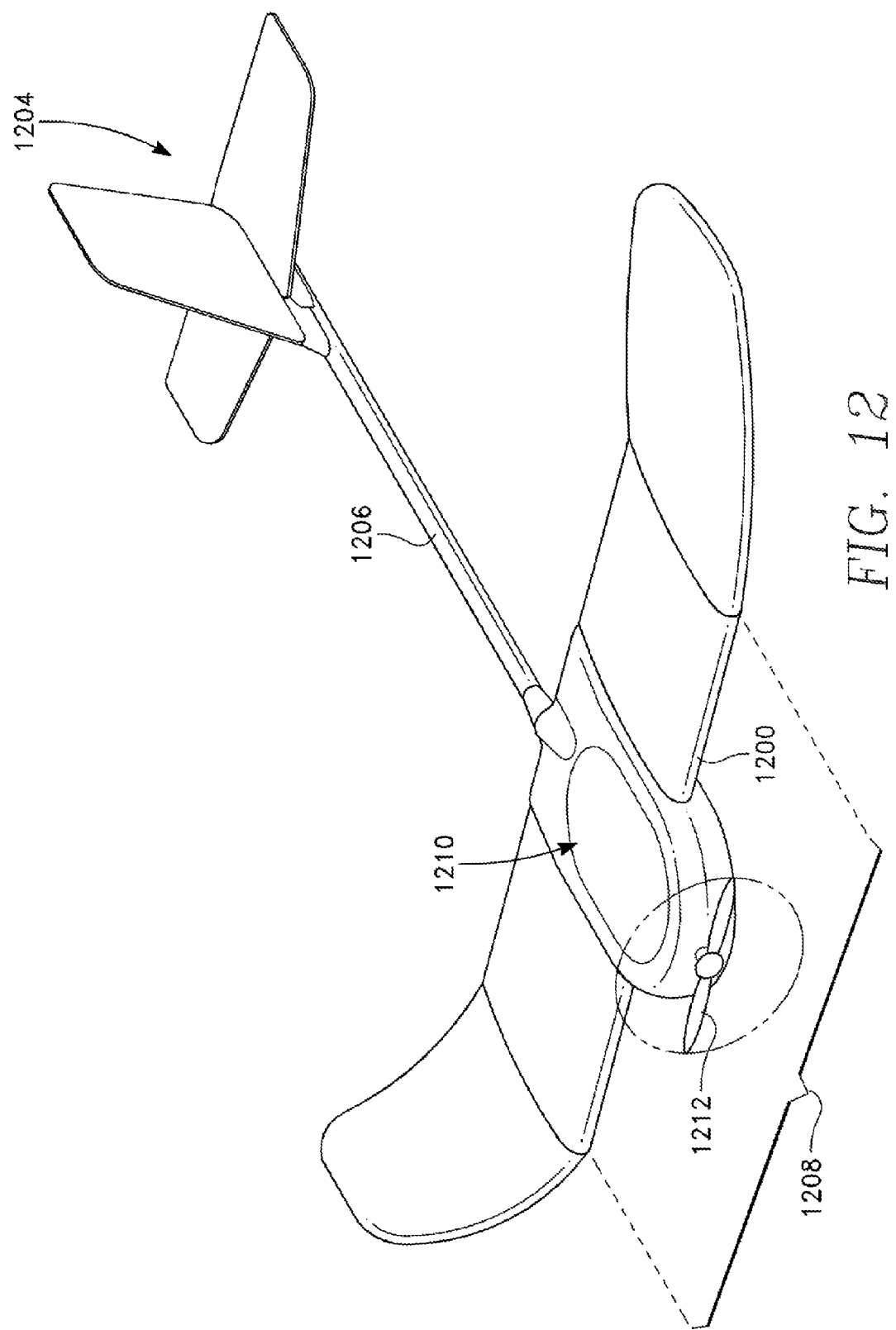
FIG. 12 is one embodiment of an aircraft system for use with the motor assembly first illustrated in FIG. 1.

A motor assembly is disclosed that has a rotatable shaft driven by a motor, a hub coupled to the rotatable shaft, the hub having a propeller indexer to receive a propeller, when a propeller is present, a sensor trigger rotatable with the shaft and positioned at a propeller offset angle $\theta_{PROP}$ from the propeller indexer and a sensor coupled to the motor and positioned to detect the sensor trigger. In this manner, the propeller indexer may be positioned at the propeller offset angle $\theta_{PROP}$ from the sensor through rotation of the shaft so that the sensor is proximate to the sensor trigger. Through suitable installation and orientation of the motor within an aircraft, the aircraft's propeller may be stopped and held in an alignment which reduces the possibility of a propeller strike with the ground as the aircraft lands. For example, with a two bladed propeller, the propeller may be positioned such that it is horizontal to the ground as the aircraft lands (e.g., the propeller would be in alignment with the wings, such as shown in FIG. 12).

Figure 1:
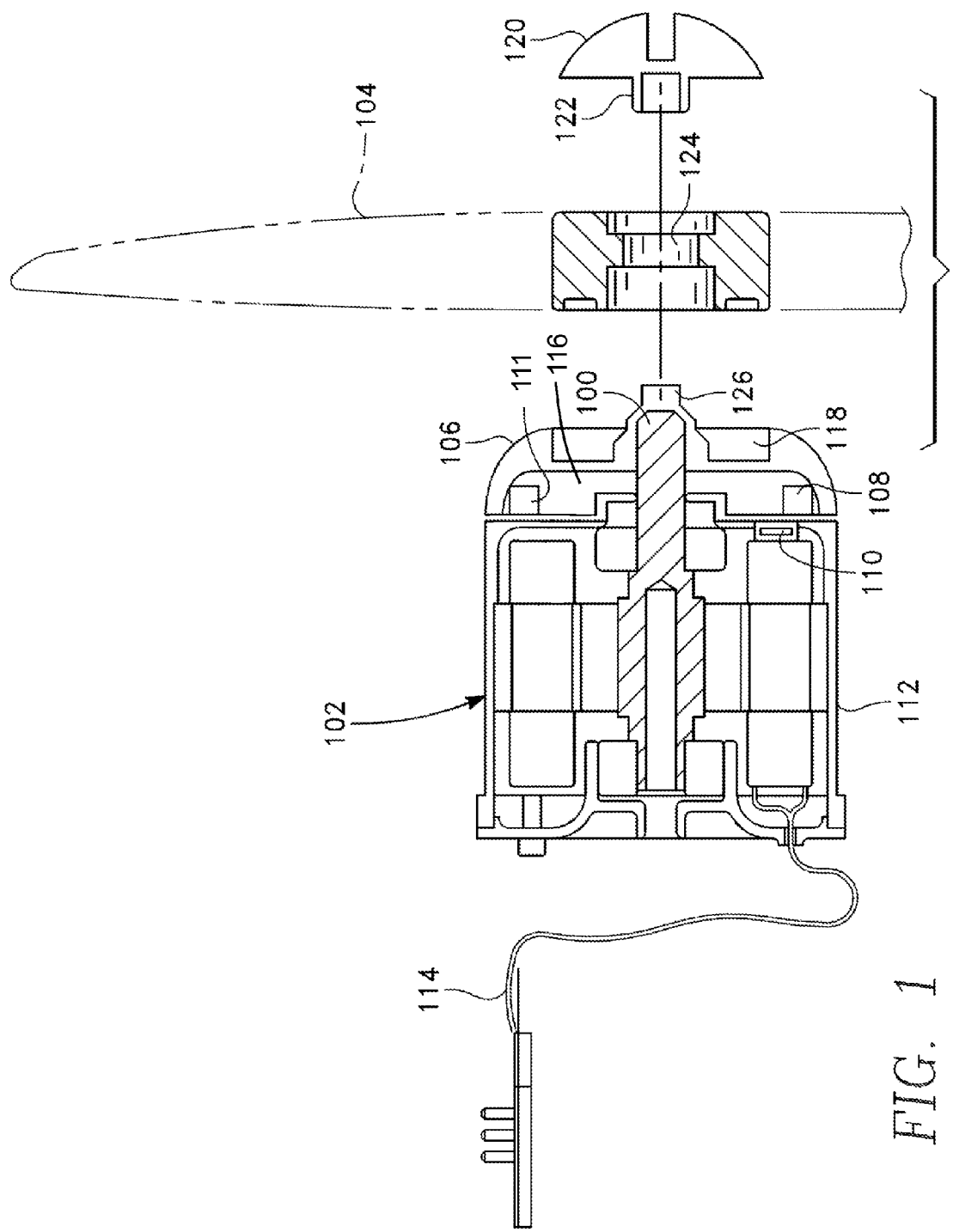
FIG. 1 is a cross-sectional view of one embodiment of a sensor coupled to a motor and positioned to detect a sensor trigger that rotates concurrently with an associated propeller.

FIG. 1 is a cross-sectional view of a motor assembly that has, in one embodiment, a sensor coupled to a motor and positioned to detect a sensor trigger that rotates concurrently with a shaft of the motor and an associated propeller. A shaft 100 of the motor 102 may drive the propeller 104 through a hub 106 that is depicted as coupled to the shaft 100. The motor 102 may be a permanent three-phase electric motor, or may be a DC motor or other motor that is operable to drive the propeller 104 through the rotatable shaft 100. A sensor trigger, e.g., a magnet 108, may be coupled to the hub 106 at an outer diameter of the hub and facing the motor. As the shaft 100 drives the hub 106, the magnet 108 rotates with the shaft 100. Although described above as coupled to the hub 106 at the outer diameter of the hub to facilitate detection by a sensor (see below), the magnet 108 may be coupled closer to a center axis of the shaft 100 to reduce the sensor moment as it rotates about the shaft. For example, the sensor trigger may be mounted on or in the propeller 104. A second magnet 111 may be coupled to the hub 106 on a side of the hub opposite from the magnet to weightably balance the hub 106 and to enable detection of the propeller 104 in either position 180 degrees apart from the sensor. In alternative embodiments, the sensor trigger is a mirror on the hub 106 to reflect an electromagnetic signal projected from the motor 102, such as an infrared beam or other light beam.

A sensor 110 is coupled to an interior of the motor casing 112 to protect the sensor from the external environment (such as dust, rain and other contaminants), with the sensor 110 fixed at a location that is complementary to the magnet 108 to facilitate detection of the magnet 108 as it is rotated with the hub 106 past the sensor 110. In embodiments in which the sensor trigger is a magnet, the sensor 110 to be triggered may be a Hall Effect sensor, such as Hall Effect sensor model A3211 made by Allegro Microsystems, Inc. of Worcester, Mass. In other embodiments, if the sensor trigger is a mirror, the sensor 110 may include a detector, such as an infrared ("IR") transceiver or other light transceiver. In embodiments where the sensor trigger is mounted on or in the propeller 104, the sensor 110 may be located in the motor casing 112 or on an exterior surface of the motor casing 112. The sensor may be in communication with a motor controller through a motor cable 114 to provide feedback for propeller angular position location. In embodiments where the motor 102 is a permanent three-phase motor, each of the phase circuits of the motor may be selectively controllable to control rotation of the propeller 104 through the shaft 100.

The hub 106 is illustrated having a conical exterior cross section with an interior cavity 116 to reduce its mass from what may otherwise be a solid component. The propeller 104 is depicted as seated in an indexer, e.g., a channel 118 having the same width as the propeller, and located on an exterior surface of the hub that is on a side opposite from the motor 102. The angular orientation of the indexer with respect to the sensor trigger 108 is predetermined to facilitate proper angular alignment of the propeller 104 versus the sensor 110, as will be described more fully below. The propeller may be seated and held in the channel 118 by a spinner nut 120. The spinner nut 120 has a spinner nut post 122 that is inserted through a center channel 124 of the propeller 102 to threadably engage a hub post 126. The spinner nut 120 may accordingly press and hold the propeller 104 against the surface of the hub 106 to enable the shaft 100 to drive the hub 106 that then drives the seated propeller 104.

Figure 2:
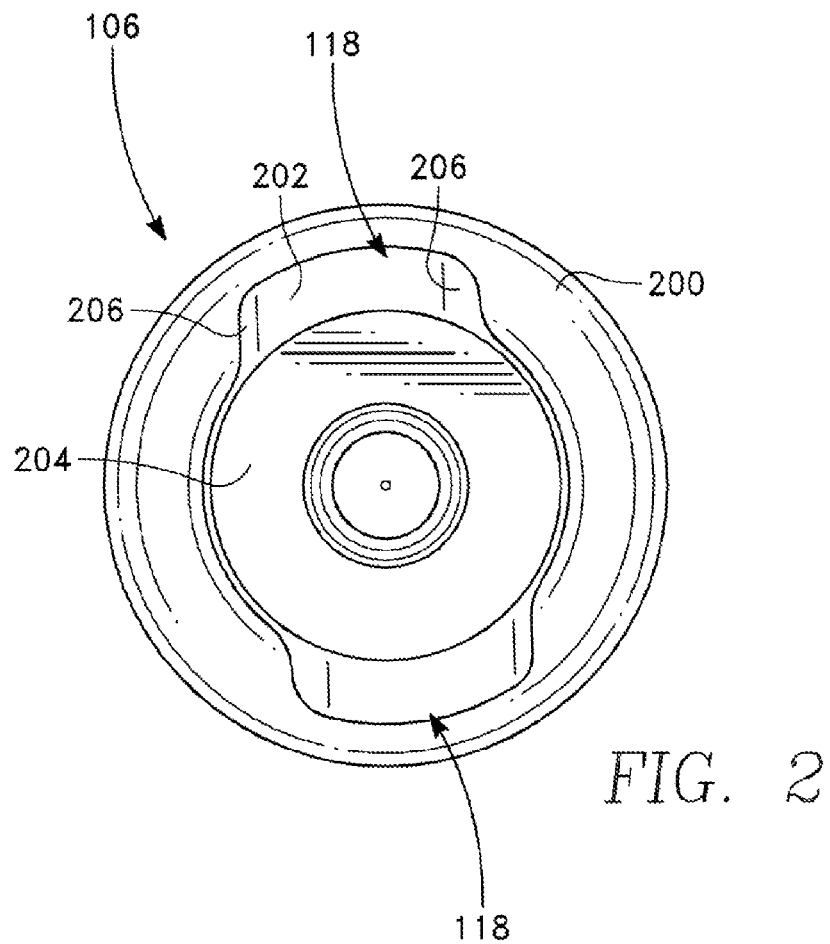
FIGS. 2, 3 and 4 are respectfully top, perspective, and rear views of the hub and channel illustrated in FIG. 1.
Figure 3:
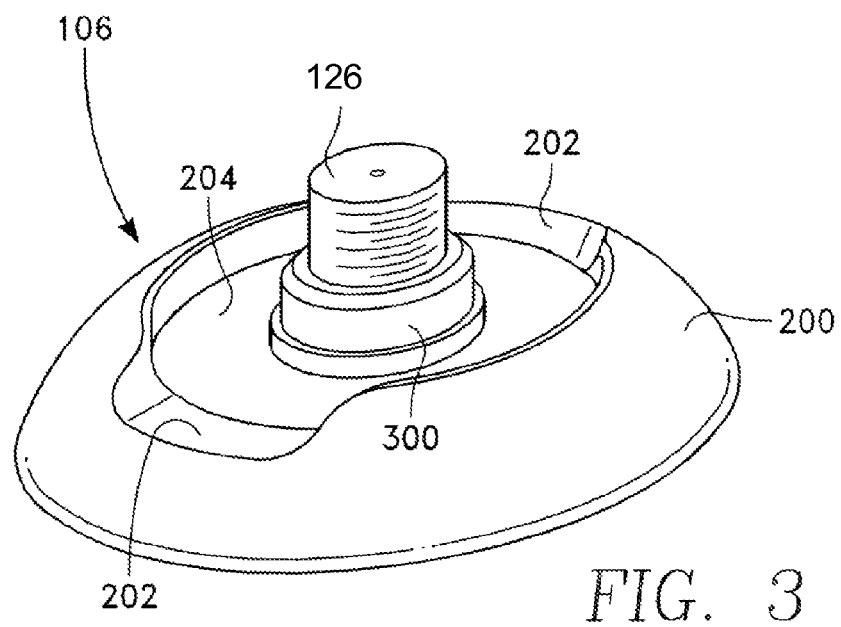
Figure 4:
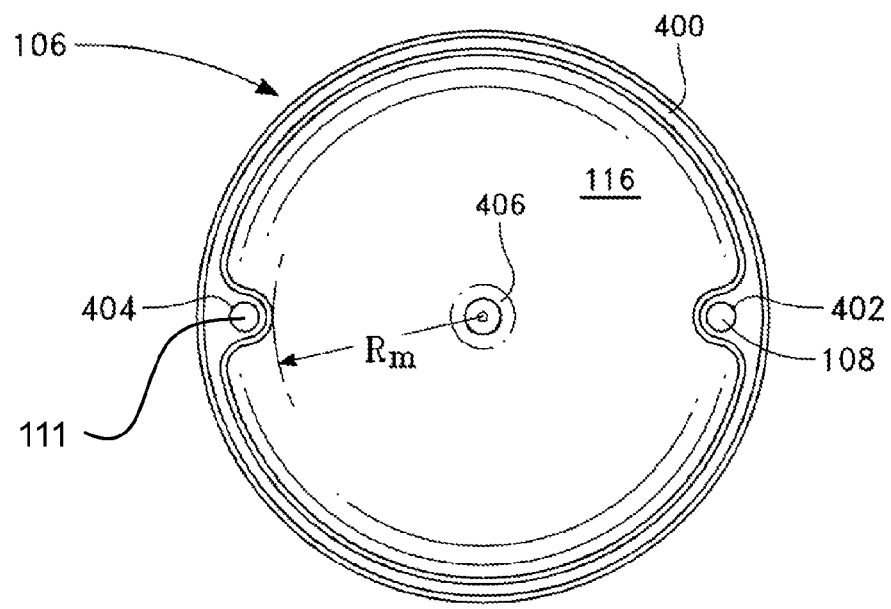

FIGS. 2, 3 and 4 are top, perspective, and rear views, respectfully, of the hub 106 and channel illustrated in FIG. 1. The channel 118 may be formed through a lip portion 200 of the hub 106 that may be conical, sloped or have an angular transition between front and back sides of the hub 106 to direct air away from a center section of the propeller and motor to increase efficiency of the propeller. The bottom surface 202 of the channel 118 is depicted as extending to a hub platform 204 to collectively seat a propeller 104. Although the bottom surface 202 of the channel 118 is illustrated as having a bottom surface 202 and side wall portions 206 that are each contoured to approximate the bottom surface of the airfoil of a utilized propeller (not shown), in an alternative embodiment, the bottom surface 202 may be flat and the sloped sidewall portions 206 may be perpendicular to the flat bottom surface 202 or at an angle to the bottom surface 202 to receive and guide a propeller as the hub 106 is driven by the shaft (see FIG. 1). The contoured side wall portions 206 may also discourage backwards installation of the propeller (resulting in reduced thrust during operation) as the contoured side walls would not match the seated propeller shape if installed backwards. In embodiments that have a flat bottom surface 202, the hub platform 204 may more completely seat the propeller or the sidewall portions 206 may be positioned to have a more prominent role in receiving and guiding the propeller as the hub 106 is driven by the shaft (see FIG. 1). The hub post 126 is depicted as extending away from the hub platform 204 to threadably engage a spinner nut post through a center channel of a propeller (see FIG. 1) to couple the propeller to the hub 106. A hub post mating surface 300 slidably receives the center channel of the propeller. Although illustrated as threaded, the hub post 126 may be formed without threads to accomplish a press-fit, an adhesive coupling, or other coupling, of the propeller to the hub 106 with or without the use of a spinner nut 120 or its equivalent.

In FIG. 4, a back skid plate 400 of the hub 106 includes a sensor trigger cavity 402 for receipt of a sensor trigger that is, in the embodiment illustrated in FIG. 1, a magnet 108. A second sensor trigger cavity 404 may be included on the back skid plate on the side of the hub opposite from the first sensor trigger cavity to receive a second sensor trigger to weightably balance the hub 106 during operation. In one implementation of the hub 106 and sensor trigger, the magnet may be formed of Neodymium to facilitate detection by a sensor 110, and the first and second magnets (108, 111) may be spaced apart on the hub at a radial distance from the center axis A. In other embodiments, the first and second magnets (108, 111) are each located a distance $R_m$ from the center axis of the hub 106 to weightably balance the hub 106 during operation. The interior cavity 116 of the hub 106 is provided to reduce the weight of the hub from what may otherwise be that of a solid structure. A shaft slot 406 is provided at the center axis of the hub 106 to receive the shaft of the motor, via, for example a press-fit.

Although the indexer is illustrated in FIGS. 2-4 as a channel, in an alternative embodiment, the indexer may be a tab or plurality of tabs extending from a surface of the hub 204 to engage the propeller to key the proper angular position of the propeller with the location of the sensor trigger. For example, the bottom surface 202 and sidewall portions 206 may be omitted to extend the hub platform 204 to provide a flat surface for receipt of a propeller. A tab or a plurality of tabs may extend from the hub platform 204 from two or more of the sidewall portion locations illustrated in FIGS. 2-4 to better index the propeller with sensor trigger cavities (402, 404).

Figure 5:
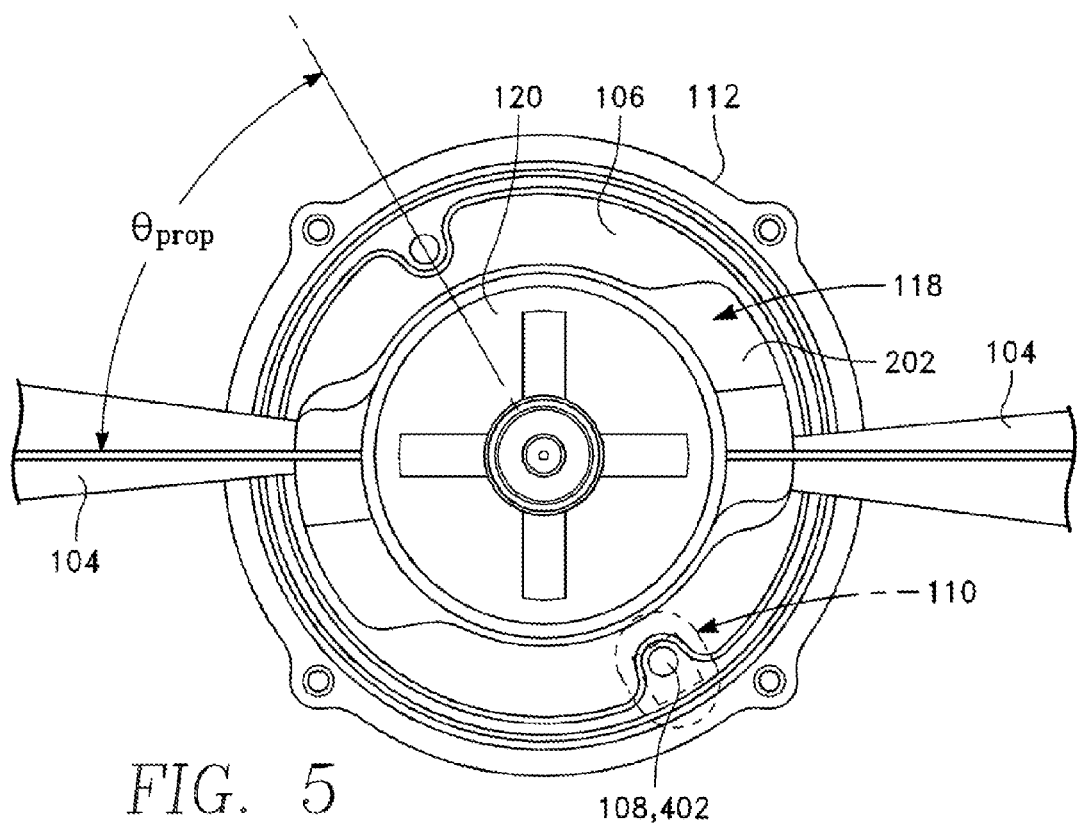
FIG. 5 is a top assembly drawing of the propeller seated on a hub that has a magnet in a proximate position to a sensor coupled to a motor casing.

FIG. 5 is a top assembly drawing of the propeller seated on the hub and fixed by the spinner nut, with a portion of the hub made transparent to illustrate the proximity of the sensor trigger with the sensor in the motor casing 112. The propeller 104 is depicted as seated on the bottom surface 202 of the channel 118, and so may be coupled to the hub 106 by the spinner nut 120. The trigger cavity 402 having the magnet 108 is revealed by example in FIG. 5, along with a sensor 110 in the motor casing 112 to illustrate alignment or proximity of the magnet 108 with respect to the sensor 110 and thereby aid in positioning the propeller 104 in a horizontal position in relation to an aircraft wing, as described more fully below. As illustrated in FIG. 5, the sensor trigger is offset approximately 45-65 degrees from the propeller at a propeller offset angle $\theta_{PROP}$; although, the propeller offset angle $\theta_{PROP}$ may be predetermined at other angles to enable alignment of the propeller in relation to an aircraft wing and may be any predetermined angle.

Figure 6:
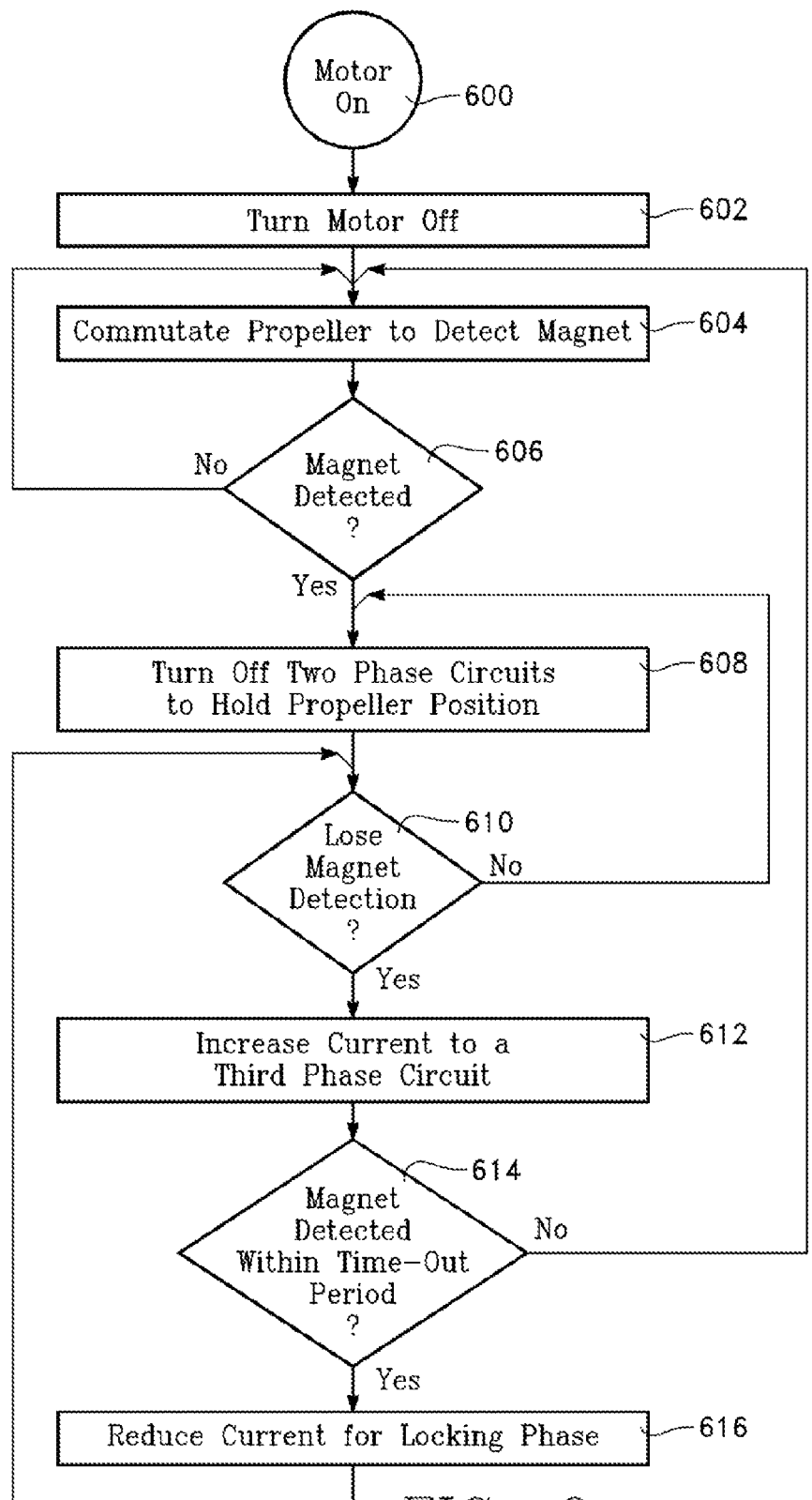
FIG. 6 is a flow diagram illustrating one embodiment of a method for holding a propeller by turning off two phase circuits of a three-phase electric motor after detecting a magnet commutating with the propeller.

FIG. 6 is a flow diagram illustrating one embodiment of a method to orient a propeller driven by a three-phase AC motor to a position that, in the case of a two-blade propeller, may be aligned to an aircraft wing. An AC motor that may drive a propeller (block 600) may be switched off (block 602) and the propeller stopped. The motor may then be selectively switched to commutate the propeller forwards by commutating a shaft of the motor (block 604), such as at approximately 180 RPM, until a sensor trigger, e.g., a magnetic field of a magnet, is detected by a sensor (test 606) positioned in the motor. In a preferred embodiment, the sensor detects the magnetic field of the magnet at an angular position of the propeller that is substantially aligned with the aircraft wing to reduce the chance of a propeller ground strike during landing. According to block 604, commutation of the propeller through the shaft may result in commutation of the propeller indexer, the propeller indexer configured to align the propeller at an angular position that is a propeller offset angle $\theta_{PROP}$ from the sensor trigger as referenced by a center of rotation of the shaft. Accordingly, in an alternative embodiment, the sensor detects the magnetic field of the magnet at a predetermined angular position that is not aligned with the aircraft wing to either enable commutation of the propeller back to alignment with the aircraft wing or to temporarily allow misalignment with the aircraft wing. If the magnet is not detected (test 606), the motor continues to commutate the propeller (block 604, test 606). In an alternative embodiment, the motor may commutate the propeller backwards until a sensor trigger is detected by the sensor.

If the magnet is detected, the motor is switched to turn off two of its phase circuits (block 608) to hold the propeller with current driven through the predetermined remaining phase circuit corresponding to the sensor's position. The sensor continues to monitor the magnetic field, where detected magnetic field variation is presumed tied to propeller position. So that drift of the propeller away from the held position may be detected. As used herein, "drift" or "drifting" may mean at least movement of the sensor trigger (such as the magnet) away from the sensor. If detection of the magnet is lost (test 610), current to the remaining phase circuit is increased (block 612), such as a current ramp of 0.1 A to 1 A to the motor, in an effort to return the magnet and propeller to the desired angular hold position. If the magnet is not detected within a predetermined time-out period (test 614), then the propeller is commutated again in order for the sensor to detect the magnet (block 604). If detection of the magnet is regained (test 614), then current to the remaining phase circuit is decreased to a nominal holding level (block 616) and the sensor continues to monitor the location of the magnet (test 610). In one embodiment of a three-phase AC motor, the propeller may come to a stop and then commutate at approximately 180 RPM until detected. Once the magnet is detected and the rotors held, the current to the remaining phase circuit may be increased from 0.1 amps to 1 amp in an effort to return the magnet and propeller to the desired hold position. If the magnet is not detected within a predetermined time-out period, the propeller may then be commutated at approximately 180 RPM until the magnet is again detected to bring the propeller into alignment with the aircraft wing. It is understood that "aligned with" or "into alignment with" herein may mean a two-blade propeller with its blades angularly aligned with the wingtips of an aircraft wing (whether or not wing dihedral exists) or may mean in a three-blade propeller a propeller that is angularly aligned with the wingtips the aircraft wing to collectively minimize any relative downward extension of the propeller blades towards the ground to reduce the possibility of a propeller ground strike during landing.

Figure 7:
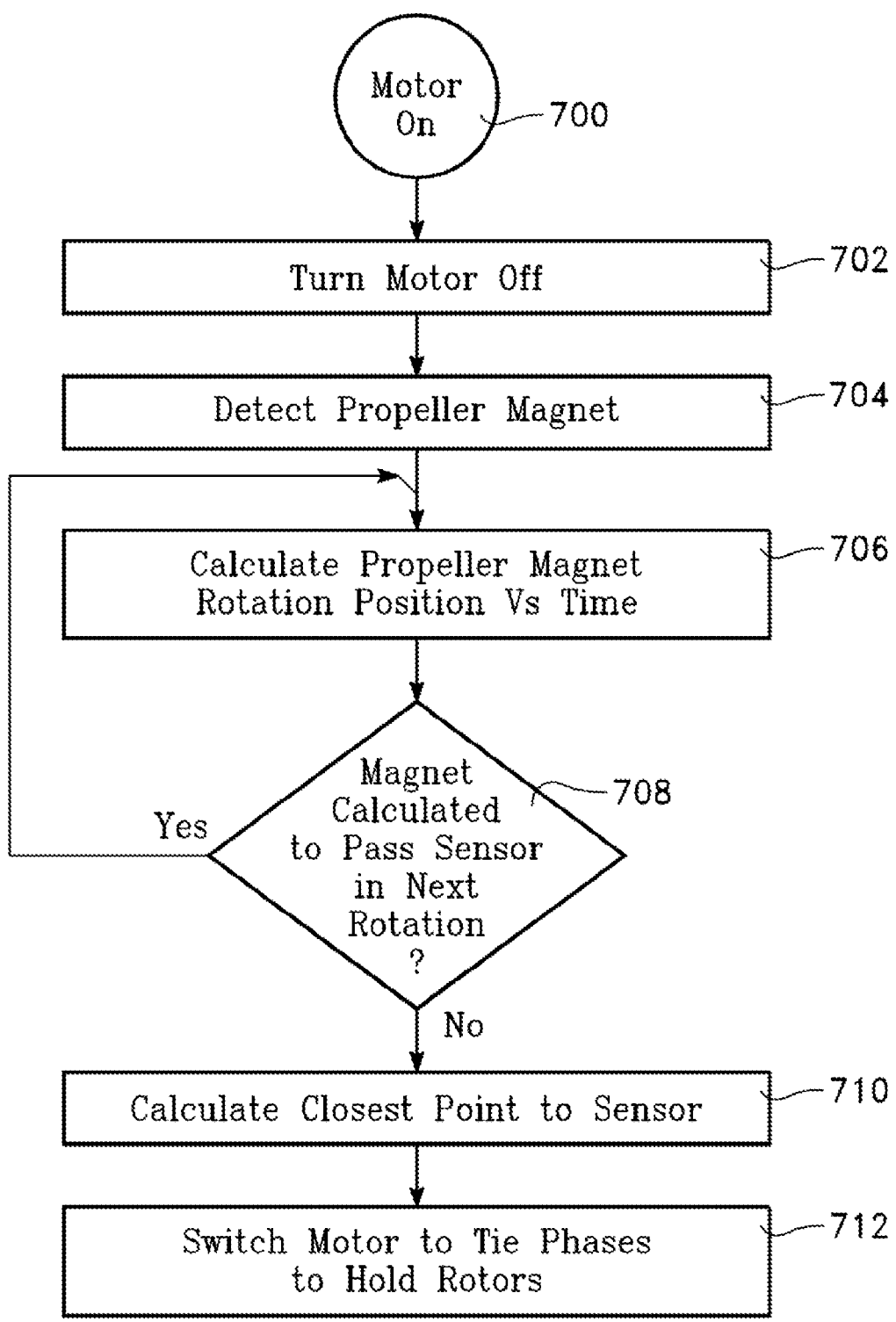
FIG. 7 is a flow diagram illustrating another embodiment of a method for holding a propeller by tying phases of a DC motor together after detecting a rotating magnet rotating with the propeller.

FIG. 7 is a flow diagram illustrating one embodiment of a method to orient a propeller driven by a DC motor to a horizontal position in relation to an aircraft wing so that the propeller is aligned with the ground at the time of landing. A DC motor that is driving a propeller (block 700) is preferably turned off (block 702) and a sensor preferably located in the motor housing attempts to detect a sensor trigger that is preferably a magnet (block 704). Once detected, a plurality of detection hits are used to calculate a propeller angle position (or sensor trigger angle position) versus time (block 706). If calculations indicate the magnet will pass the sensor in the next rotation (test 708), then the sensor monitors for detection of a subsequent rotation (test 708, block 706). If calculations determine that the magnet will not pass the sensor during a next rotation due to the propeller slowing down (test 708), the time of closest approach of the magnet to the sensor is calculated (block 710), and at such time the motor is switched to tie phases (block 712) to hold the rotors driving the motor shaft to hold the propeller.

Figure 8:
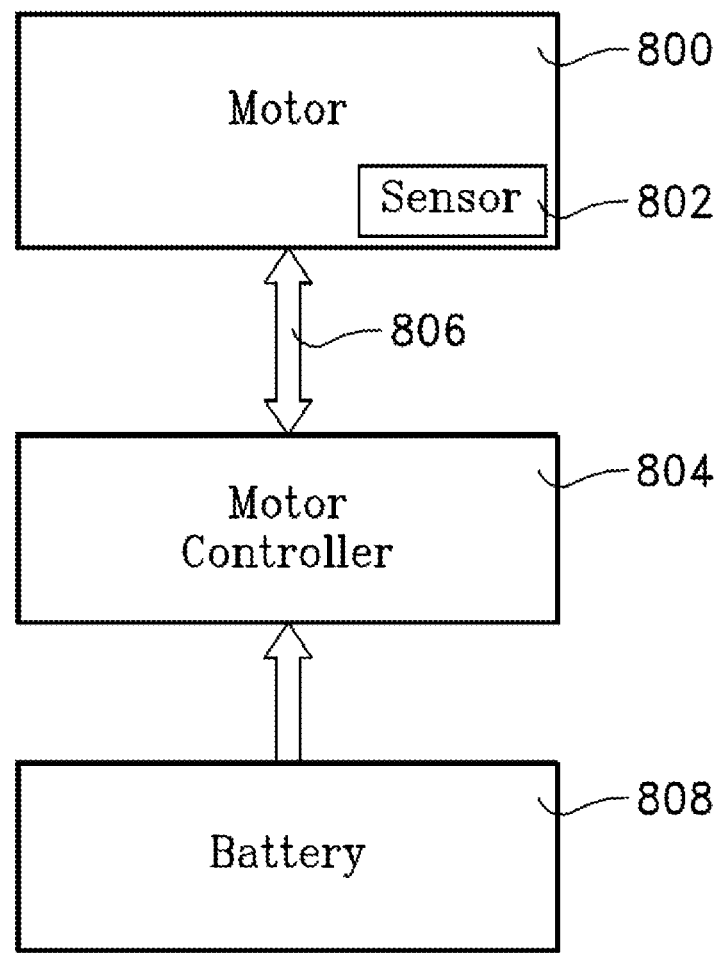
FIG. 8 is a block diagram illustrating one embodiment of a system for controlling a motor having a sensor.

FIG. 8 is a block diagram illustrating one embodiment of a sensor electrically coupled to motor, and the motor being driven by a motor controller coupled to a battery. The motor, preferably a three-phase AC motor 800, is in communication with a sensor 802 that preferably sits in the motor's casing to protect it from the external environment. The motor 800 is in communication with a motor controller 804 through a motor cable 806 that provides power and data communication between them. Data provided by a sensor 802 is also provided to the motor controller 804 through the motor cable 806. A battery 808 provides power to drive the motor 800 and is preferably switched by the motor controller 804. In an alternative embodiment, the battery 808 is electrically connected to the motor 800, with the motor controller 804 providing appropriate switching out of the battery to the motor. The sensor 802 may be any type of sensor, including magnetic, optical, sonic, or others. In an exemplary embodiment, the sensor 802 is a Hall Effect sensor to detect a magnetic field of a magnet that, via propeller rotation, passes in proximity to the sensor 802. In other embodiments, the sensor may be an optical receiver or transceiver to detect infrared (IR) light or light having other wavelengths that may or may not be in the motor casing but rather in communication with the motor or otherwise coupled to it. For example, the sensor may be in communication with the motor controller 804 and coupled to an exterior side of the motor 800. In another embodiment, the motor controller is incorporated into the motor 800 as an integrated unit, with the battery 808 connected to the integrated unit to provide power.

Figure 9:
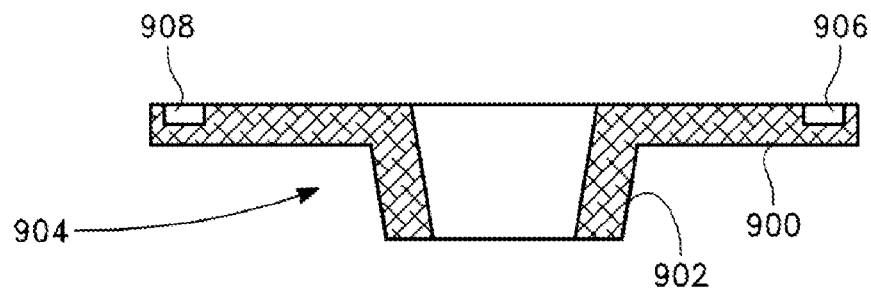
FIGS. 9, 10 and 11 are cross-sectional, back plan and perspective views, respectively, of one embodiment of a hub for use with indexing a propeller to align the propeller with the wing of an aircraft.
Figure 10:
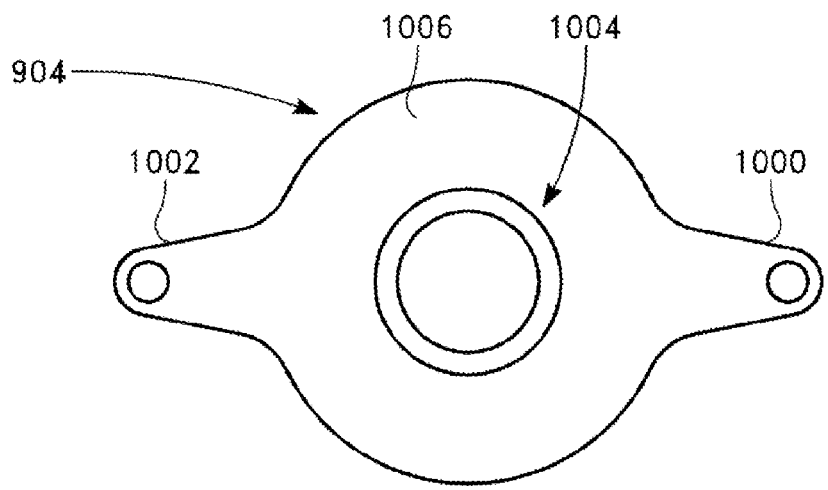
Figure 11:
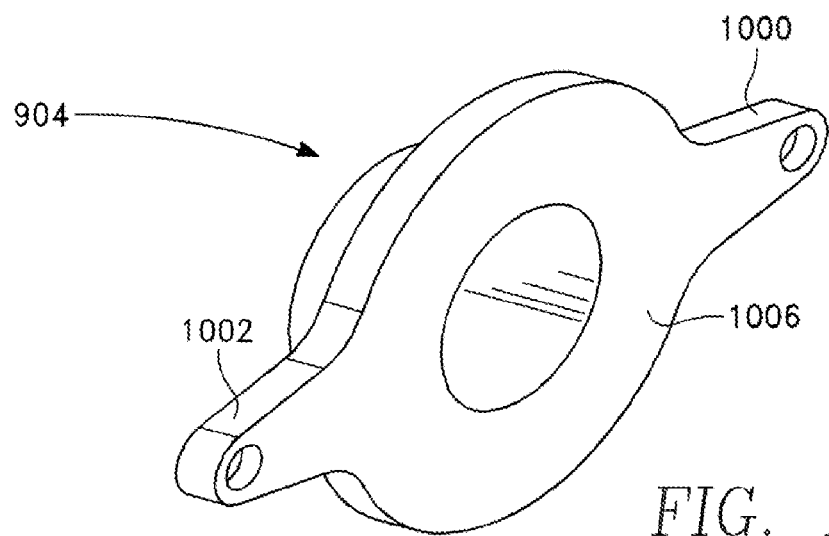

FIGS. 9, 10 and 11 are cross-sectional, back plan and perspective views, respectively, of one embodiment of a hub for use with indexing a propeller to align with the wing of an aircraft. In this embodiment, a propeller (not shown) may be aligned to seat on a base 900 and adjacent sidewalls 902 of a hub 904. The hub 904 may then be coupled to a shaft (not shown). In the illustrated embodiment, first and second trigger cavities (906, 908) are formed on opposing sides of the hub 904 in respective propeller indexers that are indexer wings (1000, 1002) extending out from a main body 1004 of the hub 904. During aircraft assembly, a propeller may be aligned with the indexer wings (1000, 1002) to ensure a known alignment of the propeller with the first and second trigger cavities (906, 908). The motor facing surface of the hub 904 may be a planar skid plate 1006 to impact on the front surface of a motor (not shown) if required to satisfy design constraints. In another embodiment, first and second magnets may be seated in respective first and second trigger cavities (906, 908). In other embodiments, the first and second trigger cavities may be omitted and mirror(s) may be fixed in such locations for use as a sensor trigger.

Although FIGS. 1-6 and 9-11 illustrate an apparatus for use with a two-bladed propeller, in alternative embodiments, the propeller may have three blades or four blades. In such embodiments, the sensor trigger may be rotatable with the shaft and positioned at a propeller offset angle $\theta_{PROP}$ from the propeller indexer and a sensor coupled to the motor and positioned to detect the sensor trigger. In this manner, the propeller indexer may be positioned at the propeller offset angle $\theta_{PROP}$ from the sensor through rotation of the shaft so that the sensor is proximate to the sensor trigger. Through suitable installation and orientation of the motor within an aircraft, the aircraft's propeller and respective blades may be stopped and held in an alignment with an aircraft wing to reduce the possibility of a propeller strike with the ground as the aircraft lands.

FIG. 12 is a perspective view of one embodiment of an aircraft for use with the motor assembly first illustrated in FIG. 1. The aircraft has a wing 1200 coupled to a tail assembly 1204 through a fuselage boom 1206. A center section 1208 of the wing 1200 has a motor assembly 1210 that includes a propeller 1212 coupled to a motor through a shaft (not shown), with the hub having a propeller indexer to receive the propeller 1212. A sensor trigger is rotatable with the shaft, and a sensor is coupled to the motor and positioned to detect the sensor trigger so that the sensor is proximate to the sensor trigger when the propeller is aligned with the wing 1200 in order to align the propeller (in a two-bladed propeller configuration) with the ground during landing. In embodiments having a three or four-bladed propeller, the propeller blades may be positioned to provide maximum ground clearance from debris when the sensor becomes proximate to the sensor trigger. In an alternative embodiment, the tail assembly may be omitted and a canard configuration may be provided in front of the wing 1200. The motor assembly 1210 illustrated as a puller-prop would be reconfigured as a pusher-prop positioned aft of the wing 1200.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. For example, although discussed primarily in relation to a UAV, controlled alignment of a propeller may apply to aircraft other than a UAV, such as use on the propeller of a VTOL aircraft in the case that alignment may help to mitigate damage during landing, or to lock the propeller(s) if advisable for safety while the aircraft is handled on the ground. Locking the propeller may also be used to align a propeller into a low-drag configuration for extension of range while gliding, such as in a two-bladed propeller embodiment. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method of securing a propeller, comprising:
commutating a sensor trigger by commutating a shaft of a motor, said motor having stators and rotors;
commutating a propeller indexer by commutating said shaft, said propeller indexer configured to align a propeller, when a propeller is present, at an angular position that is a propeller offset angle $\theta_{PROP}$ from said sensor trigger as referenced by a center of rotation of said shaft;
sensing said sensor trigger as said sensor trigger rotates to a point adjacent a sensor fixedly coupled to said motor; and
switching a control signal to rotatably hold said rotors driving said rotatable shaft in response to said sensor sensing said sensor trigger;
wherein said propeller indexer may be held in position at the propeller offset angle $\theta_{PROP}$ from the sensor by commutating said shaft and holding the rotors so that the sensor is proximate to the sensor trigger; and
wherein said propeller propels an aircraft having an aircraft wing, and wherein said sensing said sensor trigger step further comprises sensing said sensor trigger as said propeller aligns with the aircraft wing.

2. The method of claim 1, wherein said switching a control signal comprises turning off two of three phase circuits driving said rotors so that a third phase current remains to provide a holding force to said rotors so that said sensor trigger is proximate to said sensor.

3. The method of claim 2, further comprising:
increasing current to said third phase circuit in response to said sensor sensing said sensor trigger is drifting away from said sensor.

4. The method of claim 3, further comprising:
commutating said shaft in response to said sensor trigger drifting away from said sensor.

5. The method of claim 3, further comprising:
holding said increasing current at a maximum holding current to recapture said sensor trigger; and
reducing said maximum holding current to a nominal holding current in response to said sensor sensing said sensor trigger.

6. The method of claim 1, wherein said sensing said sensor trigger comprises sensing a magnet using a Hall Effect sensor.

7. The method of claim 1, wherein said sensor trigger is a mirror and said sensing said sensor trigger comprises sensing electromagnetic radiation reflected by said mirror.

8. A method of securing a propeller, comprising:
commutating a sensor trigger by commutating a shaft of a motor, said motor having stators and rotors;
commutating a propeller indexer by commutating said shaft, said propeller indexer configured to align a propeller, when a propeller is present, at an angular position that is a propeller offset angle $\theta_{PROP}$ from said sensor trigger as referenced by a center of rotation of said shaft;
sensing said sensor trigger as said sensor trigger rotates to a point adjacent a sensor fixedly coupled to said motor;
switching a control signal to rotatably hold said rotors driving said rotatable shaft in response to said sensor sensing said sensor trigger;
calculating a sensor trigger angular location verses time determining said sensor trigger will not pass said sensor in a next rotation of the sensor trigger; and
initiating said switching said motor to electrically couple phase circuits in response to said determining said sensor will not pass said sensor in a next rotation of the sensor trigger step;
wherein said propeller indexer may be held in position at the propeller offset angle $\theta_{PROP}$ from the sensor by commutating said shaft and holding the rotors so that the sensor is proximate to the sensor trigger; and
wherein said switching a control signal to rotatably hold said rotors comprises switching the motor to electrically couple phase circuits to magnetically hold said rotors.

9. The method of claim 8, wherein said initiating said switching motor to electrically couple phase circuits further comprises calculating a nearest position of said sensor trigger to said sensor for a next rotation of said sensor trigger and initiating said switching motor to electrically couple said phase circuits at said nearest position.

10. A method of securing a propeller, comprising:
commutating a sensor trigger by commutating a shaft of a motor, said motor having stators and rotors;
commutating a propeller indexer by commutating said shaft, said propeller indexer configured to align a propeller, when a propeller is present, at an angular position that is a propeller offset angle $\theta_{PROP}$ from said sensor trigger as referenced by a center of rotation of said shaft;
sensing said sensor trigger as said sensor trigger rotates to a point adjacent a sensor fixedly coupled to said motor; and
switching a control signal to rotatably hold said rotors driving said rotatable shaft in response to said sensor sensing said sensor trigger;
wherein said propeller indexer may be held in position at the propeller offset angle $\theta_{PROP}$ from the sensor by commutating said shaft and holding the rotors so that the sensor is proximate to the sensor trigger; and
wherein said propeller propels an aircraft having an aircraft wing and wherein said sensing said sensor trigger step further comprises sensing said sensor trigger as said propeller is not aligned with the aircraft wing.

11. A motor assembly, comprising:
a motor having a rotatable shaft;
a hub coupled to said rotatable shaft, said hub having a propeller indexer to receive a propeller, when the propeller is present;
a sensor trigger rotatable with said shaft and positioned at a propeller offset angle $\theta_{PROP}$ from said propeller indexer; and a sensor coupled to said motor and positioned to detect said sensor trigger;

wherein said propeller indexer is positioned at the propeller offset angle $\theta_{PROP}$ from the sensor through rotation of said shaft so that said sensor is proximate to the sensor trigger, and wherein said sensor trigger is coupled to said propeller.

12. The assembly of claim 11, wherein said sensor trigger is a magnet.

13. The assembly of claim 12, wherein said sensor is a Hall Effect sensor.

14. The assembly of claim 11, wherein said sensor trigger is coupled to said hub.

15. The assembly of claim 14, further comprising:
a second sensor trigger coupled to said hub on a side of said hub opposite from said sensor trigger to weightably balance said hub.

16. The assembly of claim 11, wherein said sensor trigger is a mirror.

17. The assembly of claim 16, wherein said sensor is an infrared detector.

18. The assembly of claim 16, wherein said sensor is a light detector.

19. The assembly of claim 11, wherein said propeller indexer is a channel to receive said propeller.

20. The assembly of claim 11, wherein said propeller indexer is a tab to seat said propeller.

21. A motor assembly, comprising:
an aircraft having a wing;
a motor coupled to said aircraft to provide propulsion, said motor having a rotatable shaft;
a hub coupled to said rotatable shaft, said hub having a propeller indexer to receive a propeller, when a propeller is present;
a magnet coupled to said hub;
a Hall Effect sensor coupled to an interior casing for said motor; and
a motor controller electrically coupled to said motor, said motor controller configured to commutate said propeller to a horizontal position indicated by the proximity of said Hall Effect sensor to said magnet wherein the propeller, if present, is aligned with said wing, the alignment based on the proximity of said Hall Effect sensor to said magnet.

22. The assembly of claim 21, further comprising:
a second magnet coupled to said hub on a side of said hub opposite from said magnet to weightably balance said hub.

23. A motor assembly, comprising:
an aircraft having a wing;
a motor mounted in said aircraft, said motor having a rotatable shaft;
a propeller coupled to said rotatable shaft, said propeller having a magnet;
a Hall Effect sensor coupled to an interior casing for said motor to detect said magnet; and
a motor controller electrically coupled to said motor, said motor controller configured to commutate said propeller to a horizontal position indicated by a proximal location of said Hall Effect sensor with said magnet
wherein said Hall Effect sensor is proximate to said magnet when said propeller is aligned with said wing.

24. A motor assembly, comprising:
a motor having a rotatable shaft;
a hub coupled to said rotatable shaft, said hub having a propeller indexer to receive a propeller, when a propeller is present;
sensor trigger means rotatable with said shaft; and
sensor means fixedly coupled to said motor and positioned to detect said sensor trigger means;
wherein said sensor means and said sensor trigger means are aligned when said propeller is in a horizontal position, wherein said sensor trigger means is a magnet, wherein said sensor means is a Hall Effect sensor, and wherein said sensor trigger means is coupled to said propeller.

* * * * *